United States Patent [19]

Goodwin

[11] Patent Number: 4,840,735
[45] Date of Patent: Jun. 20, 1989

[54] PROCESS FOR THE REMOVAL OF CYANIDE AND OTHER IMPURITIES FROM SOLUTION

[75] Inventor: Ernest Goodwin, Manitouwadge, Canada

[73] Assignee: Hemlo Gold Mines Inc., Toronto, Canada

[21] Appl. No.: 189,806

[22] Filed: May 3, 1988

[30] Foreign Application Priority Data

Jun. 23, 1987 [CA] Canada ................................ 540430

[51] Int. Cl.$^4$ .............................................. C02F 1/52
[52] U.S. Cl. ................................... 210/721; 210/724; 210/726; 210/759; 210/904; 210/912; 423/87; 423/55; 423/367
[58] Field of Search .............. 210/702, 717, 719, 721, 210/724, 726, 752, 757, 758, 759, 763, 904, 912; 423/55, 87, 34, 140, 367

[56] References Cited

U.S. PATENT DOCUMENTS 3,617,567 11/1971 Mathre .............................. 210/904
4,070,281 1/1978 Tagashira et al. .................. 210/664
4,211,646 7/1980 Westbrook et al. ................ 210/904
4,428,840 1/1984 Mudder et al. ..................... 210/726
4,537,686 8/1985 Borbely et al. ..................... 210/904
4,615,873 10/1986 Devuyst et al. .................... 210/904
4,622,149 11/1986 Devuyst et al. .................... 210/904

FOREIGN PATENT DOCUMENTS 2534458 2/1976 Fed. Rep. of Germany ...... 210/904
47-10959 4/1972 Japan ................................. 210/904
51-50283 5/1976 Japan ................................. 210/904
53-123559 10/1978 Japan ................................. 210/726

Primary Examiner—Peter Hruskoci
Attorney, Agent, or Firm—Fleit, Jacobson, Cohn & Price

[57] ABSTRACT

A process for the removal of cyanide and other impurities from an aqueous solution is disclosed. The process comprises adding copper ion and ferrous ion as reagents to the solution at a pH of about 4 to 8 with a ratio of copper to cyanide in the range of 3:1 to 10:1 by weight and with a ratio of iron to copper of at least 0.3:1 by weight.

11 Claims, 1 Drawing Sheet

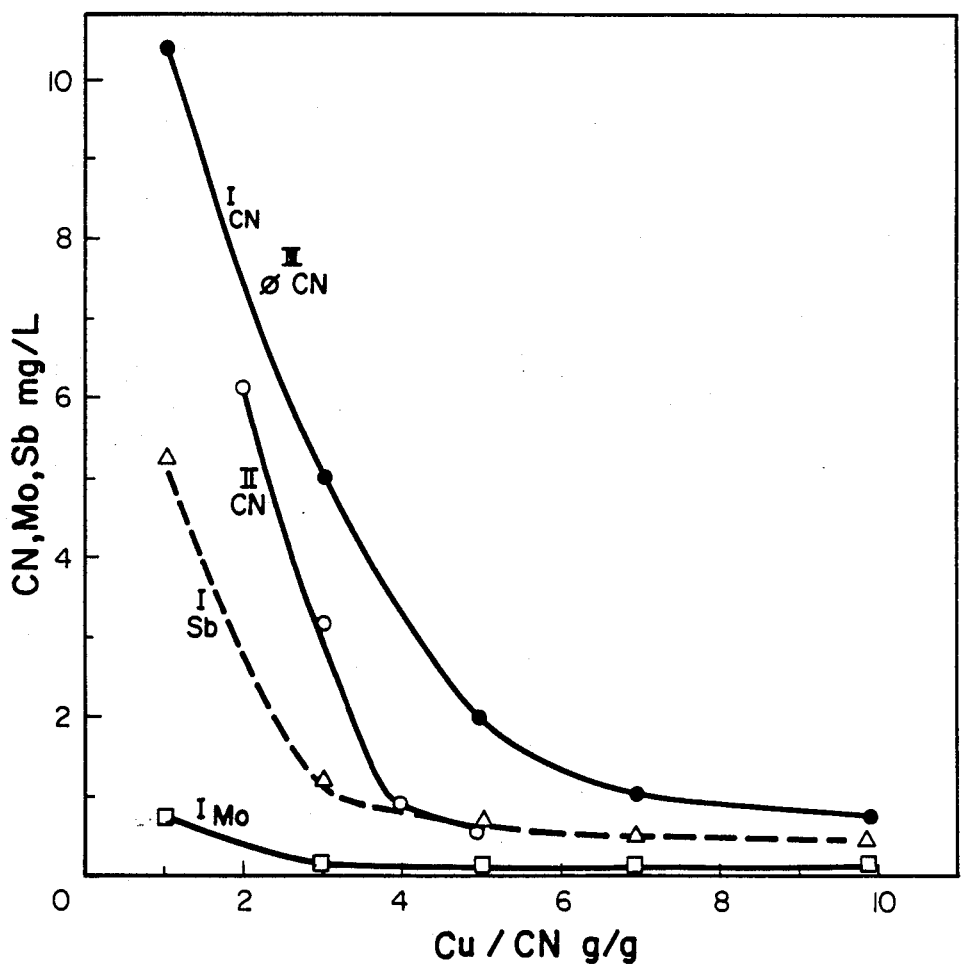

PROCESS FOR THE REMOVAL OF CYANIDE AND OTHER IMPURITIES FROM SOLUTION

This invention relates to a process for the removal of cyanide and other impurities such as arsenic, antimony and molybdenum from an aqueous solution, such as a mining effluent.

Gold ores often contain pyrite and associated sulphides of copper, nickel, and other materials such as molybdenum, and also sometimes sulphides of arsenic and antimony. During the extraction of gold from the ore with alkaline cyanide solution, the sulphidic impurities are also attacked and report to the solution as either cyanide complexes, in the case of the common metals, or other forms in the case of impurities such as arsenic and antimony. Some soluble sulphur also appears as thiocyanate. Following the recovery of the gold from the solution, a portion or all of the latter must be discarded to prevent a build-up in the cyanide circuit of impurities which are deleterious to the extraction and recovery of gold. The discarded solution will also contain substantial levels of zinc cyanide if the gold has been recovered by precipitation with zinc powder. In any case, the solution must be treated to eliminate the cyanide and the other impurities before it can be discharged to the environment.

In Canadian Pat. No. 1,165,474 and the corresponding U.S. Pat. No. 4,537,686 issued to Inco Limited, there is disclosed a process for removal of cyanide from aqueous effluent solutions using sulphur dioxide and air in the presence of a copper catalyst. This process, however, does not remove other impurities, such as antimony.

It is also known to use peroxide to remove cyanide from effluent solutions but peroxide will not remove antimony either.

Chlorine may also be used to remove cyanide but does not remove iron cyanide complexes or antimony.

In Russian Pat. No. 528265, there is disclosed a process for removal of copper and cyanide from wastewaters using copper sulphate and sodium sulphite. The patent does not disclose removal of other impurities such as arsenic and antimony.

In Canadian Pat. No. 1,183,617 issued to Heath Steele Mines Limited, there is disclosed a cyanide destruction process using liquid sulphur dioxide and copper sulphate. Again the patent does not disclose removal of other impurities.

U.S. Pat. No. 4,622,149 issued to Inco Limited discloses a process for the destruction of cyanide with sulphur dioxide and air in the presence of a copper catalyst, and precipitation of antimony and arsenic with ferric ions. This essentially is a combination of the process disclosed in the prior Inco Limitted patent referred to above with the well known action of ferric ion for removing arsenic and antimony.

It is the object of the present invention to provide a novel process for the removal of cyanide and other impurities such as arsenic, antimony and molybdenum in a simple and efficient manner.

The process in accordance with the present invention comprises adding copper ion and ferrous ion as reagents to an effluent solution at a pH of about 4 to 8 with a ratio of copper to cyanide in the range of 3:1 to 10:1 by weight and with a ratio of iron to copper of at least 0.3:1 preferably from 0.5:1 to 2:1 by weight.

Surprisingly it was found that the ferrous ion reduces the copper ion to cuprous which removes the cyanide and simultaneously there is produced in situ ferric hydroxide which removes other impurities.

The two reagents can be added separately or sequentially, but preferably in combination as an aqueous solution. Any soluble salt of copper and iron (II) can be used, for instance, the sulphate.

The process can be operated within the pH range of 4–8 using lime, if necessary, to neutralize the natural acidity of the reagents. However, if all the aforementioned impurities are present together, it is preferable to maintain the pH between 6 and 7.5 and most preferably about 6. At a pH near 8 and above, impurity removal will be poor, while at a pH below 4 and with a high concentration of cyanide there may be a danger of toxic hydrogen cyanide evolution.

The dosage of copper ion is adjusted in proportion to the level of cyanide in the solution being treated. A ratio of Cu/CN of about 5:1 by weight is preferred, but satisfactory results can be obtained with a ratio of about 3:1. A ratio of 10:1 may be needed to achieve very low cyanide levels, e.g. <1 ppm, if necessary. The dosage of ferrous ion is broadly related to that of the copper addition and preferably should be such as to provide an Fe/Cu ratio of about 1.5:1, but a particular solution may require some adjustment to this value. In any case, some impurities may not be removed to sufficiently low levels, e.g. under 1 mg/L, if the Fe/Cu ratio is too low.

Cyanide and impurity removal takes place rapidly upon addition of the reagents to the solution, within a few minutes, and at the most within 60 minutes. However, certain metals liberated by the decomposition of cyanide complexes, nickel for instance, remain soluble within the pH range of treatment. In that case, the pH must be raised to about 10 in a subsequent step to achieve adequate purification. The pH can be adjusted with lime. Before raising the pH it is however essential to separate the solids which have been formed as a result of the addition of copper and iron.

It is believed that the process of the invention readily dissociates to simple cyanides many metals cyanide complexes which are difficult to destroy by known processes. These simple cyanides can then be removed by the present process, or can be eliminated by other known methods. It is, therefore, possible to combine the present process with a subsequent polishing treatment consisting, for example, in the addition of an oxidizing agent, such as hydrogen peroxide which can be conveniently added to the solution at a suitable pH at the end of the present process. Although it is possible to achieve adequate purification by addition of copper ion and ferrous ion, followed, if necessary, by an increase in pH as described earlier, it may be more economical and expedient to conduct a treatment in two stages, ie removal of the major part of the cyanide and decomposition of the cyanide complexes with copper ion and ferrous ion, and completion of the treatment with any method already known in the art, e.g. addition of $H_2O_2$.

The process described above is not sensitive to temperature and can be operated successfully from near the freezing point of the solution up to about 30° C.

The process is suitable for purifying solutions containing cyanide and other impurities at levels usually found in effluents from gold ore processing plants, i.e. from a few mg/L to several tens or hundreds of mg/L. If sufficient reagents are added according to the dosages specified above, it will be possible to achieve an acceptable degree of purification.

The process can be operated batchwise or continuously by using conventional agitated tanks and clarifiers.

While not wishing to be bound by theory, the following process chemistry is postulated:

In the reagent solution at its natural pH<2, the reaction $$Cu^{2+} + Fe^{2+} \rightleftharpoons Cu^+ + Fe^{3+}$$

proceeds to the right to only a minute extent. But upon addition of the reagent to the treated solution at pH 6-8, the equilibrium is displaced towards the right:

$$Cu^{2+} + Fe^{2+} + 3OH^- \rightarrow Cu^+ + Fe(OH)_3$$

or even $$Cu(OH)_2 + Fe^{2+} + OH^- \rightarrow Cu^+ + Fe(OH)_3$$

depending upon the exact pH and the concentration of copper since this is the range for copper precipitation to the ppm level. The reaction is further favoured by the presence of $CN^-$ because of the formation of insoluble cuprous cyanide, CuCN. This in turn forces the dissociation of the cyanide complexes of zinc, copper and nickel if present; for example:

$$Cu(CN)_3^{2-} \rightarrow Cu(CN)_2^- + CN^-$$

$$Cu(CN)_2^- \rightarrow CuCN + CN^-$$

$$Cu^+ + CN^- \rightarrow CuCN$$

Note that $ZnCN_2$ and $Ni_2(CN)_4$ are relatively soluble and decompose to $Zn^{2+}$ and $Ni^{2+}$ which only precipitate at pH 9 and 10, respectively.

Ferrocyanide, on the other hand, precipitates as cupric ferrocyanide, $Cu_2Fe(CN)_6$, immediately upon addition of copper. A side reaction also takes place with cuprous ions:

$$Cu^+ + CNS^- \rightarrow CuCNS$$

but CuCNS is much more soluble than CuCN and the reaction only proceeds partially, at least at copper dosages of Cu/CN = 3.

The other impurities, such as As, Sb and Mo are removed by the ferric hydroxide formed in situ.

The above chemistry can account for the observed overall results, but there are probably other reactions in this complex system.

The invention will now be disclosed by way of example, with reference to the accompanying drawing illustrating the effectiveness of the process in removing cyanide, molybdenum and antimony and with reference to the following examples:

EXAMPLE 1

Solutions of copper sulphate (1% Cu) and ferrous sulphate (1% Fe) were mixed to give two reagent solutions containing iron and copper in the proportions of 1:1 and 1.5:1. Varying amounts of the 1:1 and 1.5:1 reagent solutions were added to 900 mL of gold ore processing waste solutions I and II, respectively. Solution I originally contained 16.8 mg/L CN, 1.2 mg/L Mo and 8.1 mg/L Sb, and solution II 22 mg/L CN. The solution temperature was 8°-10° C. initially and was not controlled. The pH was adjusted to 6-7 with lime. After 2 h of agitation, the resulting slurries were settled and the solutions filtered and analyzed. The temperature of the slurries had risen to nearly room temperature during the tests. The results in the FIGURE demonstrate the effectiveness of the process in removing cyanide, molybdenum and antimony under the preferred conditions described earlier. The FIGURE also shows the results of a similar test on a gold ore processing waste solution III originally containing 12.1 mg/LCN at ratios of Cu/CN=2.5 and Fe/Cu=2.6, ie. an attempt to relace copper by ferrous iron. The pH was adjusted to 6.0 with lime. Cyanide removal was poor.

EXAMPLE 2

In two tests, copper sulphate and ferrous sulphate solutions were added either consecutively or together to 900 mL of waste solution at about 9° C. The reagent addition was calculated to give ratios of Cu/CN of 5:1 and Fe/Cu of 1:1. After 10 min. of agitation at pH 6-7, adjusted with lime, the resulting slurries were settled and the solutions filtered and assayed. The results in Table 1 show that all impurities except copper were removed to below 1 mg/L in both cases.

TABLE I

| | | mg/L | | | | |
|---|---|---|---|---|---|---|
| | pH | CN | Cu | Fe | Sb | Mo |
| Cu and Fe added consecutively | 6.6 | 0.35 | 4.5 | <0.1 | 0.3 | <0.1 |
| Cu and Fe added as a premixed solution | 7.0 | 0.25 | 3.0 | <0.1 | 0.4 | 0.2 |
| Waste Water | 9.3 | 25.4 | 4.2 | 4.6 | 8.9 | 1.3 |

Removal of the copper would require an increase in pH as explained earlier.

EXAMPLE 3

Waste water from a plant processing gold ore by cyanidation was passed at a flowrate of 230-240m³/h through a series of three agitated tanks each with a capacity of 200m³. A solution of copper sulphate and ferrous sulphate containing 26 g/L Cu and 31 g/L Fe (Fe/Cu=1.2:1) was added continuously to the first tank at a rate calculated to give a Cu/CN ratio of 3:1. Lime slurry was also introduced to the first tank to maintain the pH above 6. The third tank was discharged to a clarifier to settle out the precipitate formed as a result of the treatment. The clarifier supernatant was passed through a fourth tank where lime slurry was added to raise the pH to 10, and a fifth tank where hydrogen peroxide solution (35% $H_2O_2$) was introduced continuously at a rate of about 10 L/h. Finally, the discharge from a sixth tank was passed through a second clarifier to settle out any remaining solids. The temperature of the raw waste water was about 3° C. Table II shows a set of typical results from this process.

TABLE II

| | | mg/L | | | | | | | |
|---|---|---|---|---|---|---|---|---|---|
| | pH | CN | Cu | Fe | Ni | Sb | Mo | CNS | Remarks |
| Raw Water | 9.1 | 23.2 | 4.1 | 5.2 | 4.8 | 7.7 | 1.2 | 44.4 | |

TABLE II-continued

|  | pH | CN | Cu | Fe | Ni | Sb | Mo | CNS | Remarks |
|---|---|---|---|---|---|---|---|---|---|
| | | | | mg/L | | | | | |
| Tank 1 | 6.77 | 2.1 | 7.4 | 0.07 | 2.9 | 1.4 | 0.2 | | Add $Cu^{2+}$, $Fe^{2+}$, lime |
| Tank 2 | 7.24 | 1.8 | 7.9 | 0.04 | 2.6 | 2.0 | 0.5 | | |
| Tank 3 | 7.28 | 1.8 | 8.2 | 0.06 | 2.7 | 1.6 | 0.5 | | |
| Tank 4 | 10.04 | 2.1 | 4.2 | 0.04 | 0.04 | 1.1 | 0.3 | | Add lime |
| Tank 5 | 9.85 | 0 | 0.14 | 0.06 | 0.02 | 0.9 | 0.2 | | Add $H_2O_2$ |
| Tank 6 | 9.84 | 0 | 0.13 | 0.06 | 0.06 | 0.9 | 0.2 | | |
| Final Effluent | 9.81 | 0.13 | 0.50 | 0.11 | 0.08 | 1.0 | 0.2 | 24.2 | includes 3.6 mg/L suspended solids |

The data show that the initial step in the process was essentially completed in the first tank, which had an average retention time of about 50 min. The polishing step with hydrogen peroxide was completed in Tank 5 and could probably have been completed in Tank 4, had peroxide been added to that tank. The final effluent assays are somewhat higher because they included the small amount of suspended solids in the second clarifier overflow. A significant fraction of the thiocyanate was also removed.

Table III gives another set of results obtained for the same waste water when using a reagent solution analyzing 21 g/L and 31 g/L Fe(Fe/Cu=1.5:1). As can be seen, soluble levels of cyanide and metals were lowered to 1 mg/L or less.

TABLE III

|  | pH | CN | Cu | Fe | Ni | Sb | Mo | CNS | Remarks |
|---|---|---|---|---|---|---|---|---|---|
| | | | | mg/L | | | | | |
| Tank 1 | 7.61 | 2.1 | 8.10 | 0.07 | 2.8 | 1.6 | 0.4 | | Add $Cu^{2+}$, $Fe^{2+}$, lime |
| Tank 4 | 10.21 | 3.1 | 5.60 | 0.06 | 0.6 | 1.0 | 0.2 | | Add lime |
| Tank 5 | 10.02 | 0 | 0.20 | 0.05 | 0.08 | 1.0 | 0.2 | | Add $H_2O_2$ |
| Final Effluent | 9.91 | 0.86 | 2.00 | 0.35 | 0.21 | 0.7 | 0.2 | 26.8 | Includes 5.0 mg/L solids |

Although the invention has been disclosed, by way of example, with refeerence to the above examples, it is to be understood that it is not limited to such examples but by the scope of the following claims.

I claim:

1. A process for the removal of cyanide, molybdenum and antimony impurities from an aqueous solution comprising adding copper ion and ferrous ion as reagents to said solution while maintaining a pH of about 4 to 8 in said solution using lime, with a ratio of copper to cyanide in the range of 3:1 to 10:1 by weight in said solution and with a ratio of iron to copper of at least 0.3:1 by weight in said solution, forming a precipitate including said impurities, and separating said precipitate from said aqueous solution.

2. A process as defined in claim 1, wherein the ratio of iron to copper is in the range of 0.5:1 to 2:1.

3. A process as defined in claim 2, wherein the dosage of iron to copper is in the ratio of about 1.5:1 by weight.

4. A process as defined in claim 1, wherein the reagents are added separately or sequentially.

5. A process as defined in claim 1, wherein the reagents are added in combination as an aqueous solution.

6. A process as defined in claim 1, wherein the reagents are provided by any suitable salts of copper and iron (II).

7. A process as defined in claim 6, wherein the salts are sulphates.

8. A process as defined in claim 1, wherein the pH of the solution is maintained in the range of 6 to 7.5.

9. A process as defined in claim 1, wherein metallic impurities remain soluble within the pH range of treatment, and wherein the pH is raised to a sufficient level in a subsequent step to remove said metallic impurities.

10. A process as defined in claim 1, wherein an oxidizing agent is added to the separated aqueous solution as a polishing treatment.

11. A process as defined in claim 10, wherein the oxidizing agent is hydrogen peroxide.

* * * * *